(12) United States Patent
Huang et al.

(10) Patent No.: US 8,624,173 B2
(45) Date of Patent: Jan. 7, 2014

(54) SENSING PIXEL STRUCTURE FOR GENERATING SENSED IMAGE WITH UNIFORM RESOLUTION AND LIGHT SENSOR

(75) Inventors: Sen-Huang Huang, Hsin-Chu (TW); Hui-Hsuan Chen, Hsin-Chu (TW); Wu-Chieh Liu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 173 days.

(21) Appl. No.: 13/295,092

(22) Filed: Nov. 13, 2011

(65) Prior Publication Data

US 2012/0241592 A1  Sep. 27, 2012

(30) Foreign Application Priority Data

Mar. 23, 2011 (TW) .............................. 100109859 A

(51) Int. Cl.
*H01L 31/00* (2006.01)
*H01L 27/00* (2006.01)

(52) U.S. Cl.
USPC .................................. 250/214 R; 250/208.1

(58) Field of Classification Search
USPC .............................. 250/208.1, 214.1; 257/440
See application file for complete search history.

(56) References Cited

U.S. PATENT DOCUMENTS

2006/0054786 A1*  3/2006  Galambos et al. ......... 250/208.1

* cited by examiner

*Primary Examiner* — Thanh Luu
*Assistant Examiner* — Renee Naphas
(74) *Attorney, Agent, or Firm* — Winston Hsu; Scott Margo

(57) ABSTRACT

A sensing pixel structure for generating a sensed image with uniform resolution is applied in a light sensor. The sensing pixel structure includes a plurality of first sensing pixels and a plurality of second sensing pixels. The location of the plurality of first sensing pixels corresponds to a center region of a lens. Each of the plurality of first sensing pixels has a first pixel area. The location of the plurality of second sensing pixels corresponds to the peripheral region of the lens. Each of the plurality of second sensing pixels has a second pixel area. The first pixel area is larger than the second pixel area, so that number of the sensing pixels corresponding to the peripheral region of the lens is larger than that corresponding to the center region of the lens. Therefore, the light sensor generates the sensed image with uniform resolution.

10 Claims, 12 Drawing Sheets

SENSING PIXEL STRUCTURE FOR GENERATING SENSED IMAGE WITH UNIFORM RESOLUTION AND LIGHT SENSOR

BACKGROUND OF THE INVENTION

1. Field of the Invention

The present invention relates to a sensing pixel structure, and particularly to a sensing pixel structure for generating a sense image with uniform resolution.

2. Description of the Prior Art

Please refer to FIG. 1, which is a diagram of an optical sensor 100 according to the prior art. The optical sensor 100 comprises a sensing pixel structure 110 and an optical lens 120. The sensing pixel structure 110 is placed corresponding to the optical lens 120. More specifically, a central region of the sensing pixel structure 110 is positioned corresponding to a central region of the optical lens 120, and a peripheral region of the sensing pixel structure 110 is positioned corresponding to a peripheral region of the optical lens 120. The sensing pixel structure 110 is used for receiving light through the optical lens 120 to generate a sense image SIM.

Please refer to FIG. 2, which is a diagram of the sensing pixel structure 110 according to the prior art. The sensing pixel structure 110 comprises B sense pixels $CSU_1$-$CSU_B$. As shown in FIG. 2, in the sensing pixel structure 110, each sense pixel $CSU_1$-$CSU_B$ has the same pixel area $AREA_{OLD}$. In other words, sense pixels (e.g. sense pixel $CSU_X$) located in the central region of the sensing pixel structure 110 and sense pixels (e.g. sense pixels $CSU_1$, $CSU_B$) located in the peripheral region of the sensing pixel structure 110 have the same pixel area $AREA_{OLD}$. In other words, the same number of sense pixels correspond to the peripheral region of the optical lens 120 as to the central region of the optical lens 120. Due to resolution of the central region of the optical lens 120 being better than that of the peripheral region of the optical lens 120, and the number of sense pixels corresponding to the peripheral region of the optical lens 120 is the same as to the central region of the optical lens 120. Thus, resolution of the sense image SIM generated by the sensing pixel structure 110 receiving light through the optical lens 120 is uneven (resolution of the central region is better than resolution of the peripheral region). For example, using the optical sensor 100 to sense a scene P shown in FIG. 3, the optical sensor 100 generates the sense image SIM shown in FIG. 4. It can be seen from FIG. 3 and FIG. 4 that the peripheral region and the central region have the same square patterns in the scene P, but because the central region of the optical sensor 100 has better resolution than the peripheral region, the square patterns in the peripheral region of the sense image SIM are distorted. Thus, when the user wants to perform further image processing on the sense image SIM, because the resolution of the sense image SIM is non-uniform, processing methods used on the peripheral region of the sense image SIM must be different from those used on the central region. This causes difficulty when the user performs image processing on the sense image SIM.

SUMMARY OF THE INVENTION

According to an embodiment, a sensing pixel structure used in an optical sensor is for generating a sense image with uniform resolution and is placed corresponding to an optical lens. The sensing pixel structure comprises a plurality of first pixels and a plurality of second sense pixels. The plurality of first sense pixels is located in a central region of the optical sensor corresponding to a central region of the optical lens. Each first sense pixel of the plurality of first sense pixels has a first pixel area. The plurality of second sense pixels is located in a peripheral region of the optical sensor, relative to the central region of the optical sensor, and corresponding to a peripheral region of the optical lens. Each second sense pixel of the plurality of second sense pixels has a second pixel area. The first pixel area is greater than the second pixel area for the peripheral region of the optical lens to correspond to more sense pixels than the central region of the optical lens for the optical sensor to generate a sense image with uniform resolution.

According to an embodiment, an optical sensor for generating a sense image with uniform resolution comprises an optical lens, and a sensing pixel structure. A central region of the sensing pixel structure is positioned corresponding to a central region of an optical lens. A peripheral region of the sensing pixel structure is positioned corresponding to a peripheral region of the optical lens. The sensing pixel structure is used for receiving light through the optical lens to generate a sense image with uniform resolution, and the sensing pixel structure comprises M sense pixels. When resolution of the central region of the optical lens is better than resolution of the peripheral region of the optical lens, in the M sense pixels, sense pixels located in the central region of the sensing pixel structure have larger pixel area than sense pixels located in the peripheral region of the sensing pixel structure, and the peripheral region of the optical lens corresponds to more sense pixels than the central region of the optical lens for the sense image to have uniform resolution. M is a positive integer, and M>1.

These and other objectives of the present invention will no doubt become obvious to those of ordinary skill in the art after reading the following detailed description of the preferred embodiment that is illustrated in the various figures and drawings.

DETAILED DESCRIPTION

In light of the above issues, a sensing pixel structure and optical sensor are provided that are for generating a sense image with uniform resolution that aids the user in later image processing.

Figure 5:
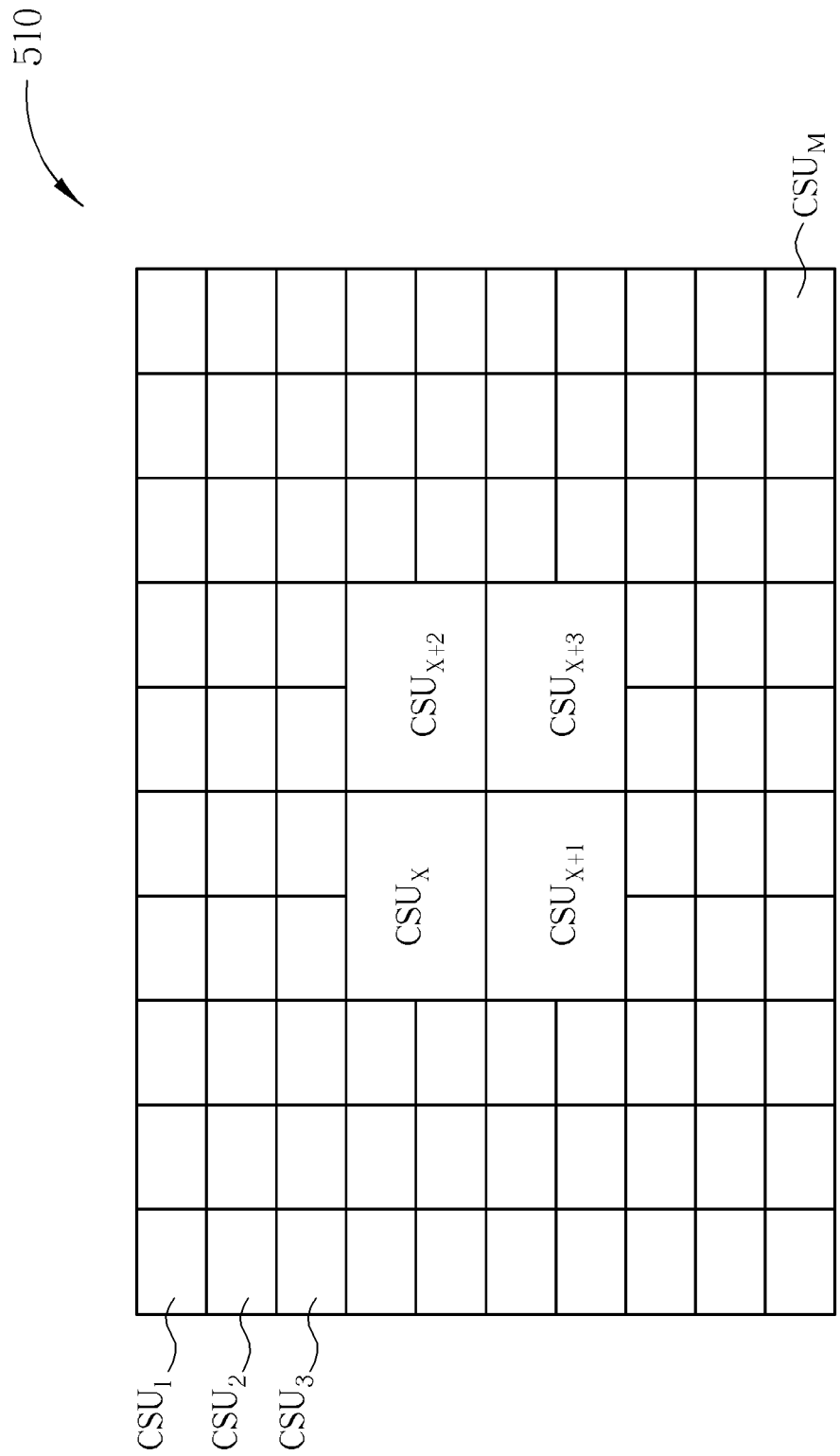
FIG. 5 is a diagram of a sensing pixel structure according to an embodiment.
Figure 6:
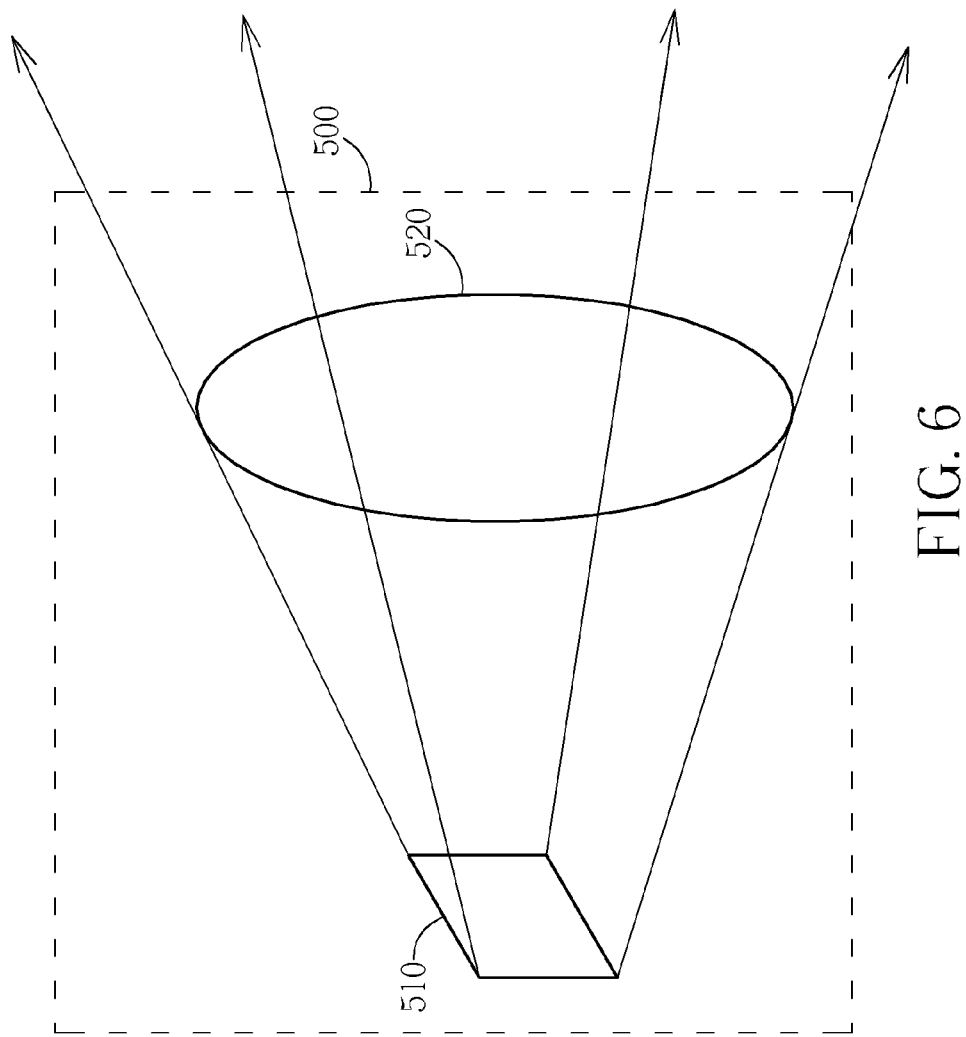
FIG. 6 is a diagram of an optical sensor according to an embodiment.

Please refer to FIG. 5, which is a diagram of a sensing pixel structure 510 according to an embodiment. The sensing pixel structure 510 is used in an optical sensor 500 shown in FIG. 6. The sensing pixel structure 510 is placed corresponding to an optical lens 520. More specifically, a central region of the sensing pixel structure 510 is positioned corresponding to a central region of the optical lens 520, and a peripheral region of the sensing pixel structure 510 is positioned corresponding to a peripheral region of the optical lens 520. The sensing pixel structure 510 is used for receiving light through the optical lens 520 to generate a sense image SIM. The sensing pixel structure 510 comprises a plurality of first sense pixels and a plurality of second sense pixels. The plurality of first sense pixels is located in the central region of the optical sensor 500, e.g. sense pixels $CSU_X$-$CSU_{X+3}$ shown in FIG. 5, and is positioned corresponding to the central region of the optical lens 520, each first sense pixel having pixel area $AREA_{C1}$. The plurality of second sense pixels is positioned in the peripheral region of the optical sensor 500 (sense pixels other than sense pixels $CSU_X$-$CSU_{X+3}$ shown in FIG. 5 are all second sense pixels), and is positioned corresponding to the peripheral region of the optical lens 520, each second sense pixel having pixel area $AREA_{C2}$. As can be seen from FIG. 5, the pixel area $AREA_{C1}$ of the first sense pixels is greater than the pixel area $AREA_{C2}$ of the second sense pixels. Thus, the peripheral region of the optical lens 520 corresponds to more sense pixels than the central region of the optical lens 520. In this embodiment, the optical lens 520 and the optical lens 120 have similar structure and principle of operation, where the central region has better resolution than the peripheral region. However, compared to the optical sensor 100, in the present embodiment, the peripheral region of the optical lens 520 corresponds to more sense pixels than the central region of the optical lens 520. In other words, in the present embodiment, resolution of the peripheral region and the central region of the sense image SIM can be adjusted by adjusting pixel area of the first sense pixels and pixel area of the second sense pixels to adjust the number of sense pixels that the peripheral region and the central region of the optical lens 520 correspond to.

Figure 1:
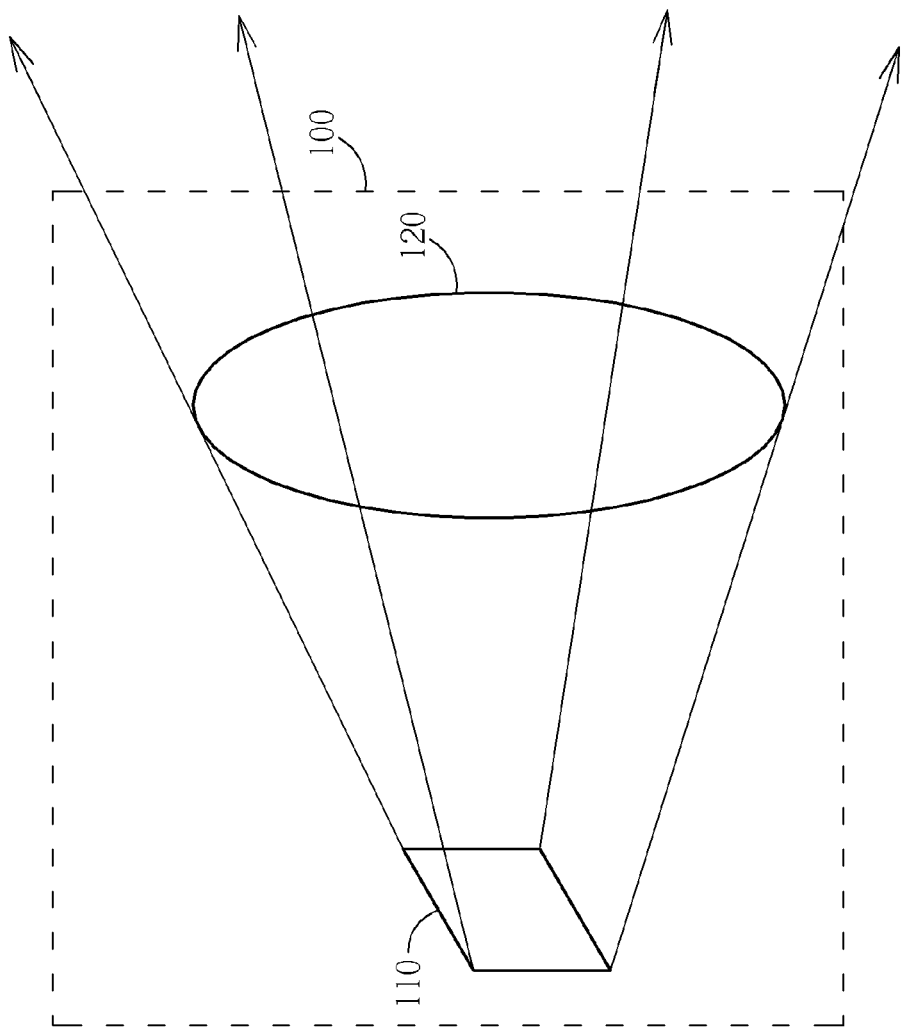
FIG. 1 is a diagram of an optical sensor according to the prior art.
Figure 2:
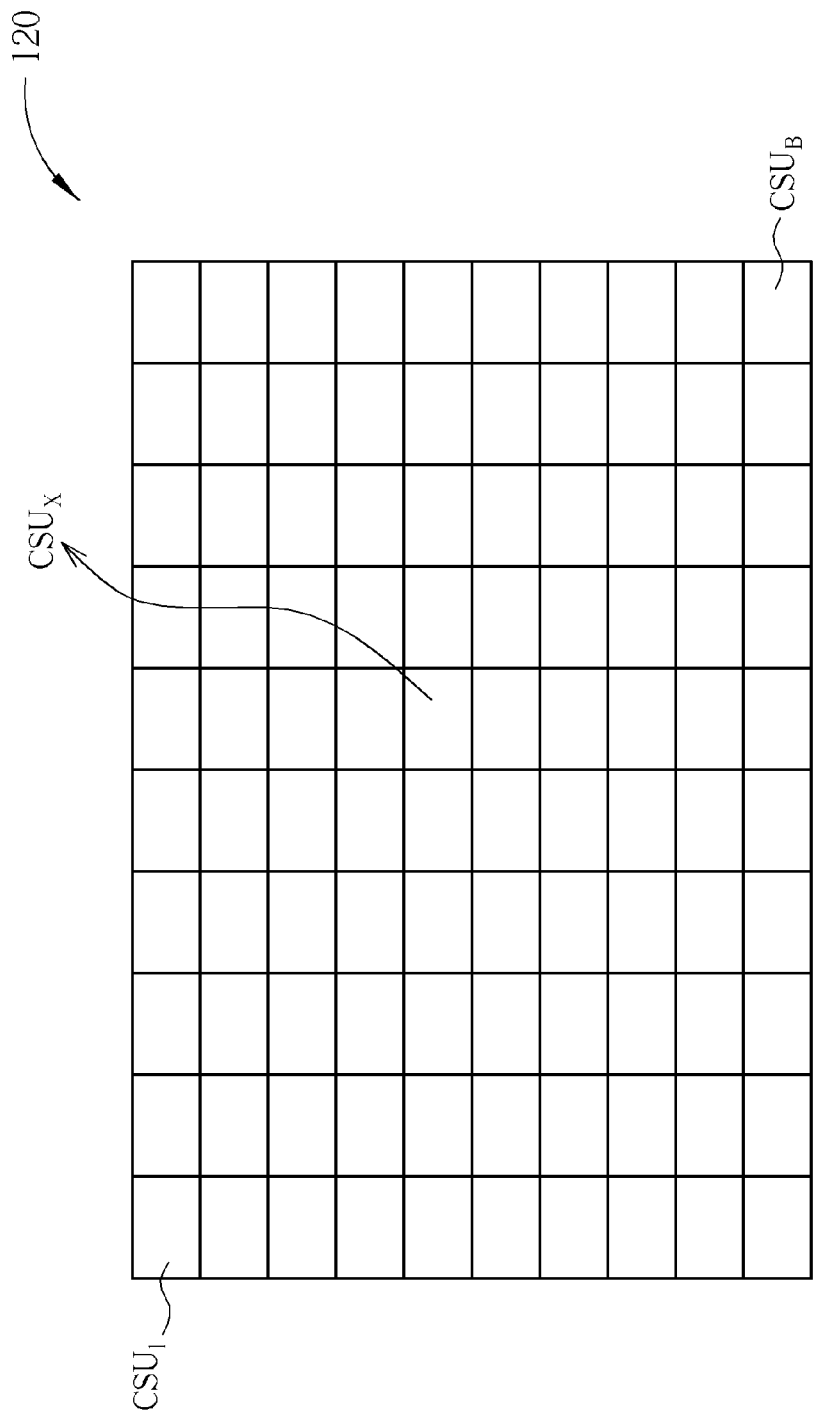
FIG. 2 is a diagram of the sensing pixel structure according to the prior art.
Figure 3:
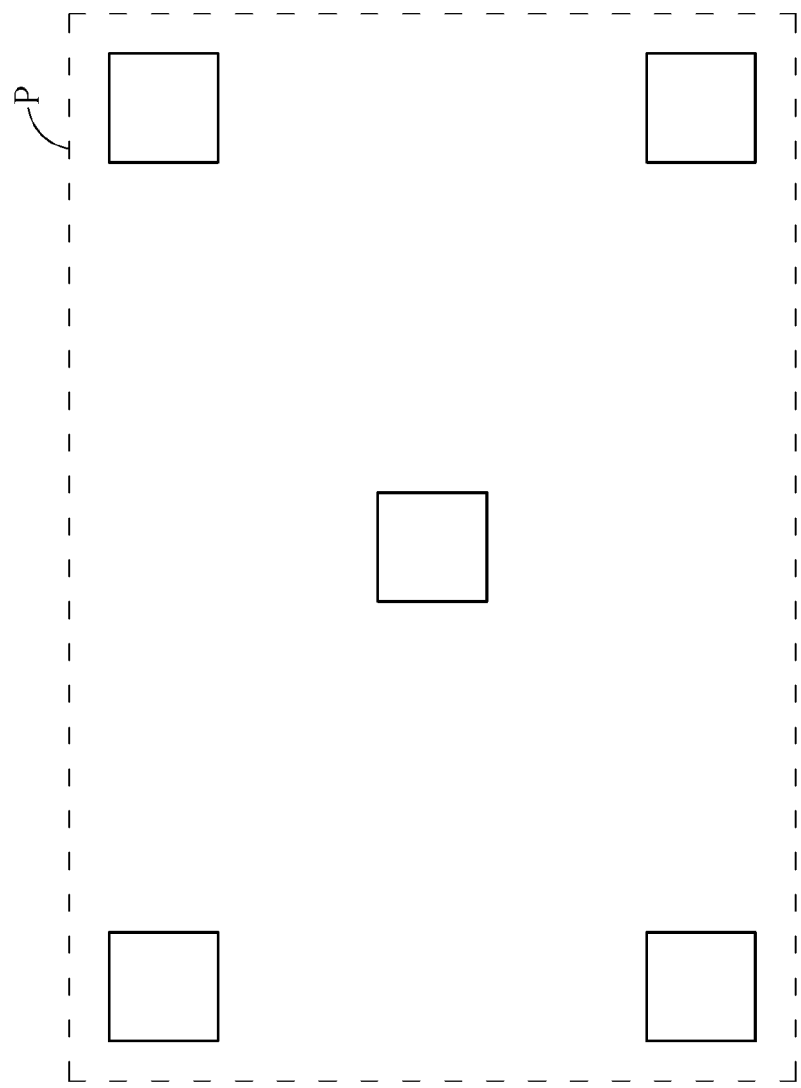
FIG. 3 is a diagram of a scene sensed by the optical sensor.
Figure 4:
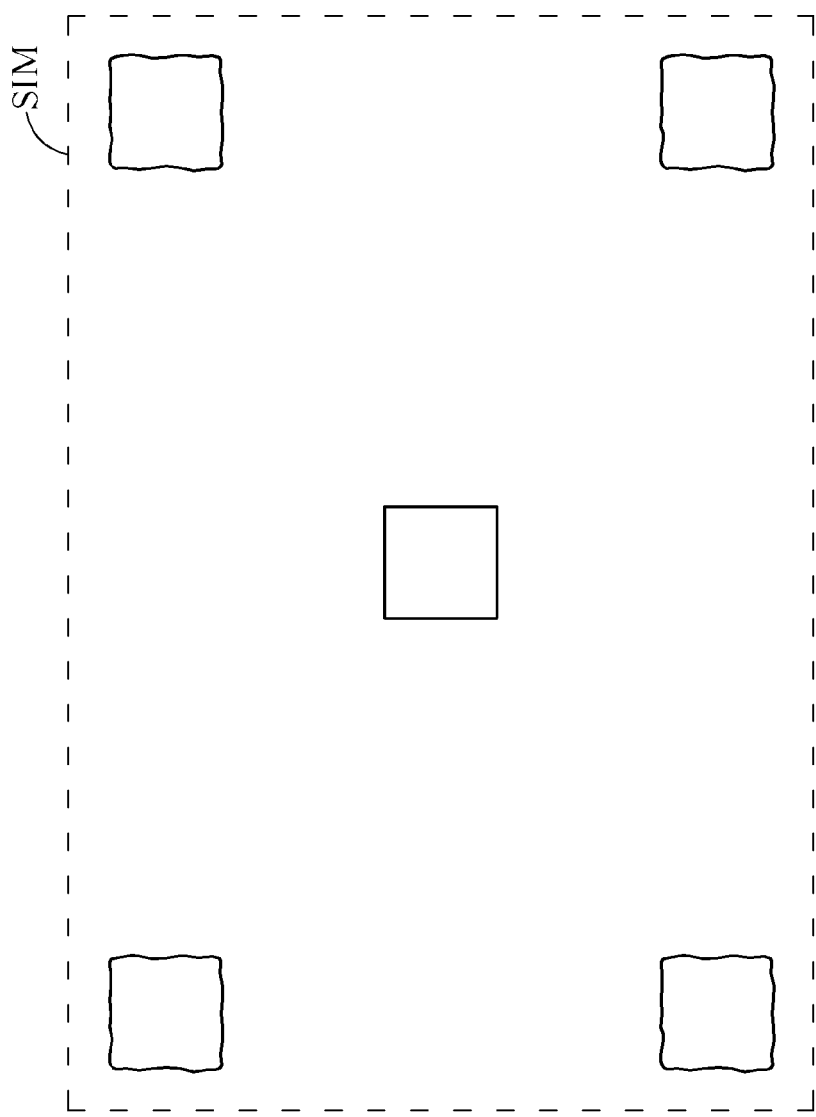
FIG. 4 is a diagram of a sense image generated by the optical sensor sensing the scene of FIG. 3.
Figure 7:
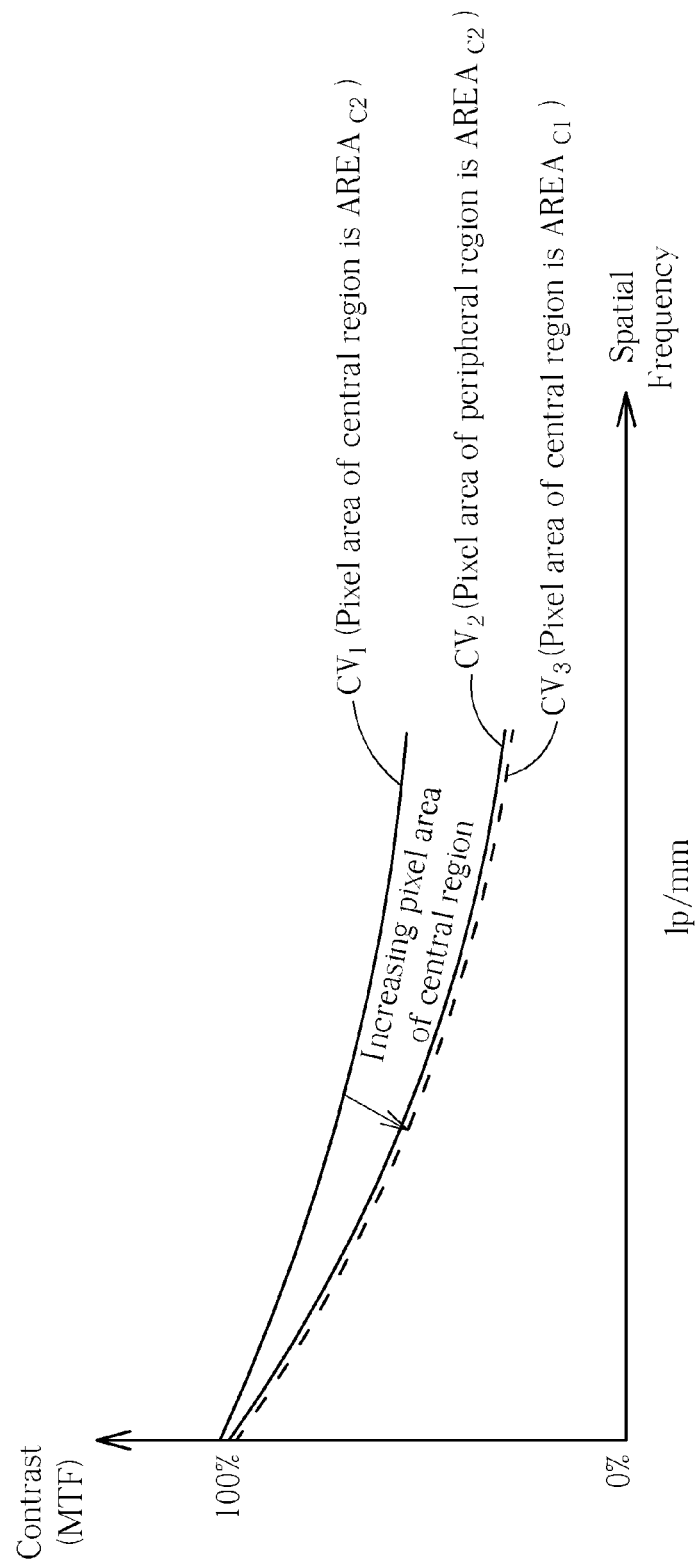
FIG. 7 is a diagram illustrating designing the pixel areas to cause the sense image to have uniform resolution.
Figure 8:
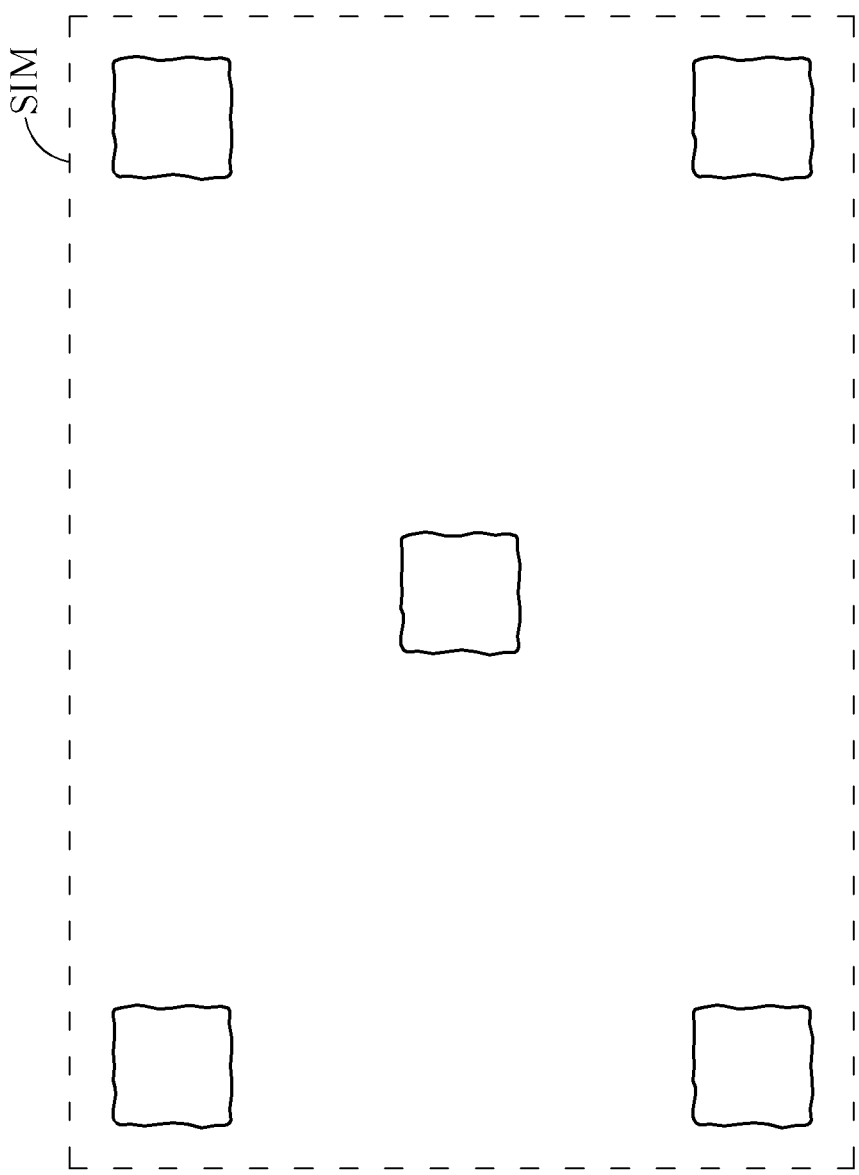
FIG. 8 is a diagram illustrating using the sensing pixel structure of FIG. 5 to sense the scene of FIG. 3 to generate a sense image.

Please refer to FIG. 7, which is a diagram illustrating designing the pixel areas $AREA_{C2}$, $AREA_{C1}$ to cause the sense image to have uniform resolution. Generally speaking, image resolution can be described in terms of a relationship between contrast and spatial frequency. For example, when special frequency is fixed, as contrast increases, image resolution also increases. Thus, to say that the sense image SIM has uniform resolution means that the relationship between the contrast and spatial frequency in the central region of the sense image SIM is approximately the same as the relationship between the contrast and spatial frequency in the peripheral region of the sense image SIM. In FIG. 7, $CV_1$ represents the relationship curve between the contrast and spatial frequency of images corresponding to the central region of the optical sensor 500 in the sense image SIM when the pixel area of sense pixels in the central region of the sensing pixel structure 510 is $AREA_{C2}$, where according to known techniques, image contrast can be represented by a modulation transfer function (MTF), and the spatial frequency can be represented by number of unit length line-pairs, e.g. lp/mm in FIG. 7 representing number of millimeter unit line-pairs. $CV_2$ represents the relationship curve between the contrast and spatial frequency of images corresponding to the peripheral region of the optical sensor 500 in the sense image SIM when the pixel area of sense pixels in the peripheral region of the sensing pixel structure 510 is $AREA_{C2}$. Due to the central region having better resolution than the peripheral region in the optical lens 520, when the pixel area of sense pixels in the central region of the sensing pixel structure 510 and the pixel area of sense pixels in the peripheral region of the sensing pixel structure 510 are both $AREA_{C2}$, in the sense image SIM, resolution of images corresponding to the central region of the optical sensor 500 is better than resolution of images corresponding to the peripheral region of the optical sensor 500 ($CV_1$>$CV_2$). If the pixel area of sense pixels in the central region of the sensing pixel structure 510 is increased, number of sense pixels corresponding to the central region of the optical lens 520 can be reduced, such that resolution of images in the central region of the optical sensor 500 ($CV_1$) can also be reduced. It can be seen from FIG. 7 that when the pixel area of sense pixels in the central region of the sensing pixel structure 510 is increased to $AREA_{C1}$, resolution of images corresponding to the central region of the optical sensor 500 (relationship curve $CV_3$) and resolution of images corresponding to the peripheral region of the optical sensor 500 (relationship curve $CV_1$) are approximately the same. In other words, by designing the pixel area of sense pixels in the central region of the sensing pixel structure 510 to be $AREA_{C1}$, and designing the pixel area of sense pixels in the peripheral region of the sensing pixel structure 510 to be $AREA_{C2}$, the optical sensor 500 can generate the sense image SIM with uniform resolution. Using the optical sensor 500 to sense the scene P shown in FIG. 3, the optical sensor 500 will generate the sense image SIM shown in FIG. 8. Relative to the sense image SIM in FIG. 4 generated by the optical sensor 100, in FIG. 8, resolution in the central region and the peripheral region of the optical sensor 500 is approximately the same, so the square patterns in the peripheral region and the central region of the sense image SIM have approximately the same amount of distortion. In other words, when the user wants to perform further processing on the sense image SIM generated by the optical sensor 500, the same processing methods can be used on both the central region and the peripheral region of the sense image SIM.

Further, compared to the sensing pixel structure 110, in the sensing pixel structure 510, the pixel area of sense pixels in the central region of the sensing pixel structure 510 is increased, while the pixel area of sense pixels in the peripheral region of the sensing pixel structure 510 is kept the same. In other words, compared to the sensing pixel structure 110, the sensing pixel structure 510 has fewer sense pixels, i.e. M<B. Thus, by using the sensing pixel structure 510, area of downstream processing circuits of the optical sensor 500, e.g. sense pixel readout circuits, can be reduced.

Figure 9:
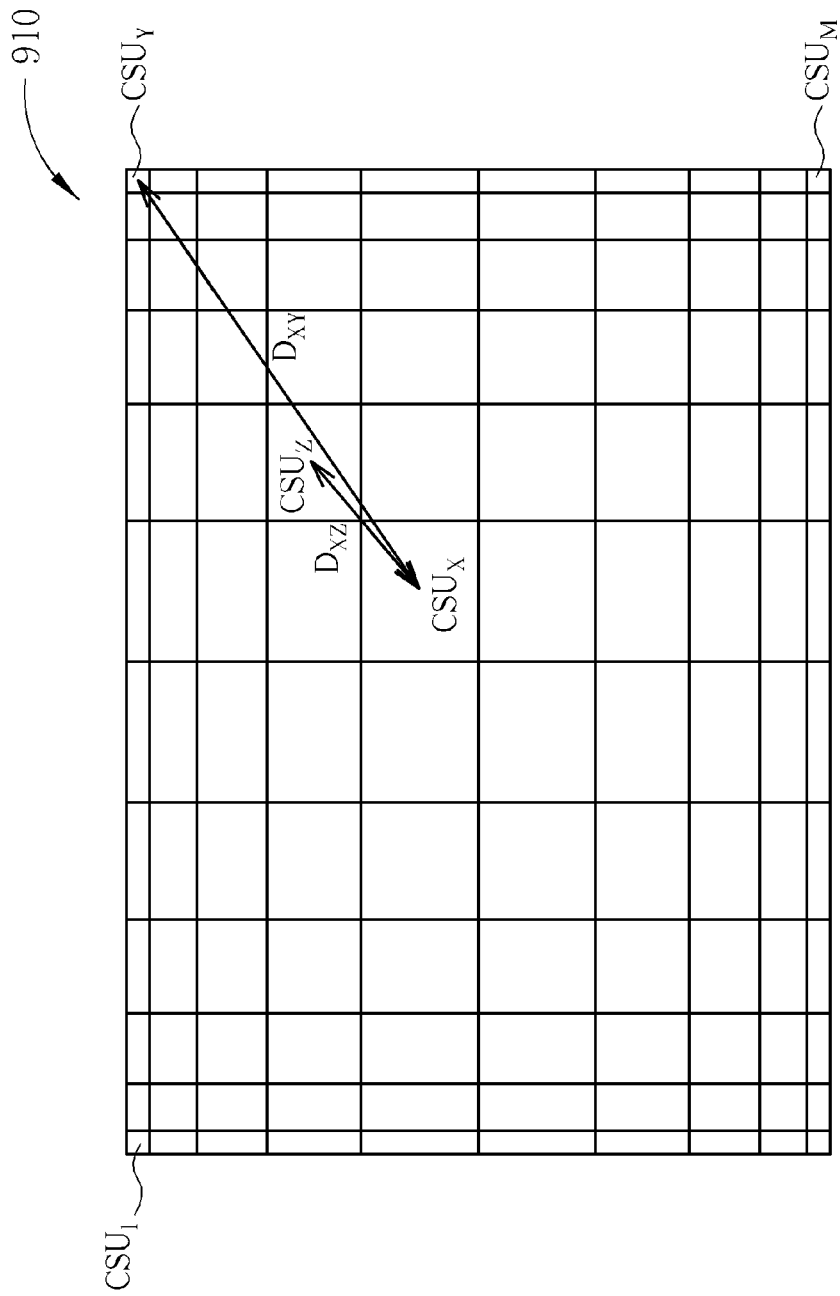
FIG. 9 is a diagram of a sensing pixel structure according to another embodiment.

Please refer to FIG. 9, which is a diagram of a sensing pixel structure 910 according to another embodiment. The sensing pixel structure 910 may be used for realizing the sensing pixel structure 510 of the optical sensor 500. The sensing pixel structure 910 comprises sense pixels $CSU_1$-$CSU_M$. As shown in FIG. 9, in the sense pixels $CSU_1$-$CSU_M$, sense pixels located in the central region of the sensing pixel structure 910, e.g. sense pixel $CSU_X$, have greater pixel area than sense pixels located in the peripheral region of the sensing pixel structure 910, e.g. sense pixels $CSU_1$, $CSU_Y$, $CSU_M$. Thus, the peripheral region of the optical lens 510 corresponds to relatively more sense pixels than the central region of the optical lens 510.

Figure 10:
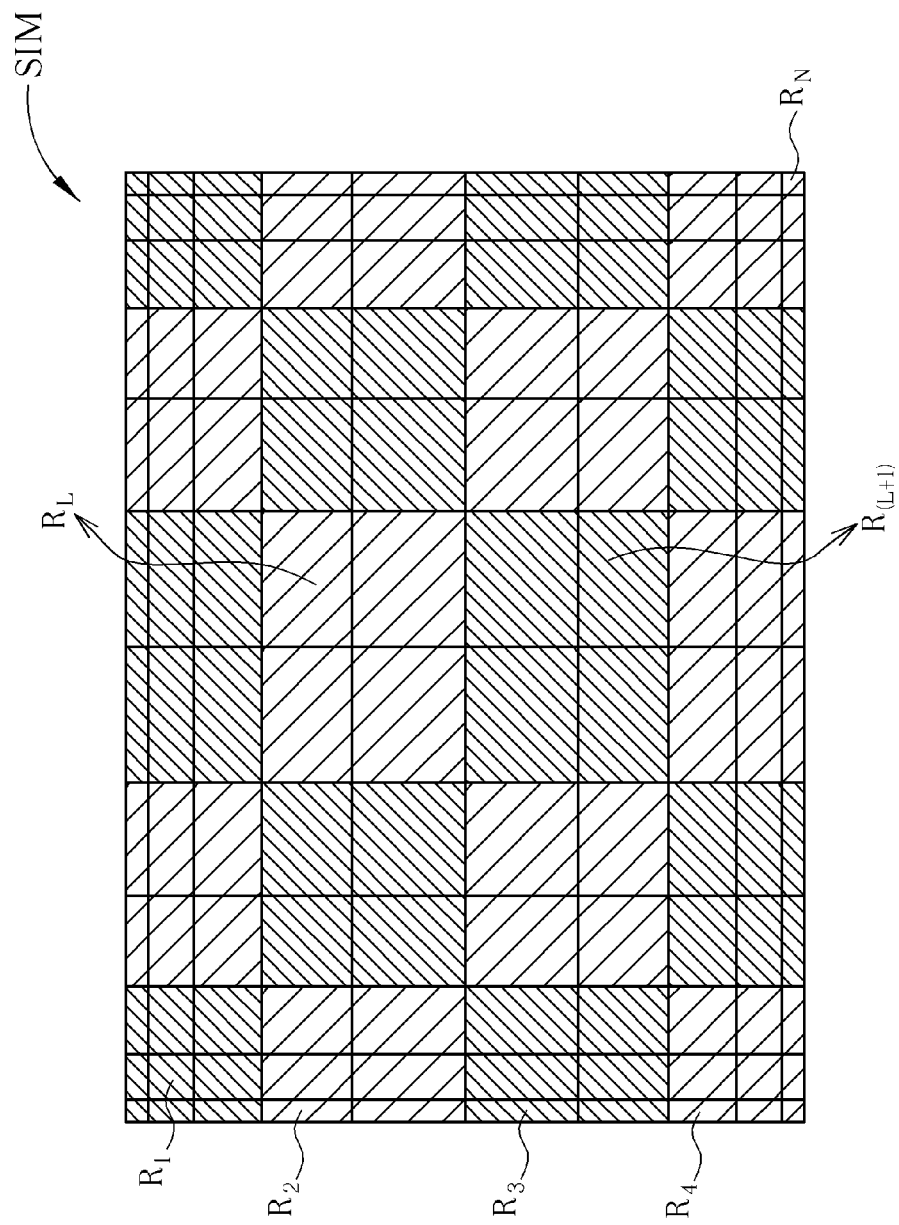
FIG. 10 is a diagram of a sense image generated by the sensing pixel structure.

Please refer to FIG. 10, which is a diagram of a sense image SIM generated by the sensing pixel structure 910. The sense image SIM can be divided into regions $R_1$-$R_N$ (in FIG. 10, different regions are depicted by different hatching orientations). For example, region $R_1$ is formed by images generated by sense pixels in the upper-left corner of FIG. 9; region $R_4$ is formed of images generated by sense pixels in the lower-left corner of FIG. 9. In order to make the resolution the same in all regions $R_1$-$R_N$ of the sense image SIM, the sensing pixel structure 910 can be designed so that sense pixels nearer to the central region of the sensing pixel structure 910 have larger pixel area, and sense pixels further from the central region of the sensing pixel structure 910 have smaller pixel area. More specifically, when designing sensing pixel structure 910, pixel area $AREA_X$ of sense pixels of the central region of the sensing pixel structure 910 (e.g. sense pixel $CSU_X$) and pixel area $AREA_Y$ of sense pixels of the peripheral region of the sensing pixel structure 910 (e.g. sense pixel $CSU_Y$) can be determined according to the method illustrated in FIG. 7. At this time, pixel area $AREA_Z$ of sense pixels between the central region and the peripheral region of the sensing pixel structure 910 (e.g. sense pixel $CSU_Z$) can be determined according to the pixel areas $AREA_X$, $AREA_Y$, distance $D_{XY}$ between the sense pixels $CSU_X$, $CSU_Y$, and distance $D_{XZ}$ between the sense pixels $CSU_X$, $CSU_Z$. More specifically, the pixel area $AREA_Z$ of sense pixels between the central region and the peripheral region of the sensing pixel structure 910 can be determined by the following equation:

$$(AREA_X - AREA_Z)/(D_{XZ}^2) = (AREA_X - AREA_Y)/(D_{XY}^2) \quad (1)$$

Figure 11:
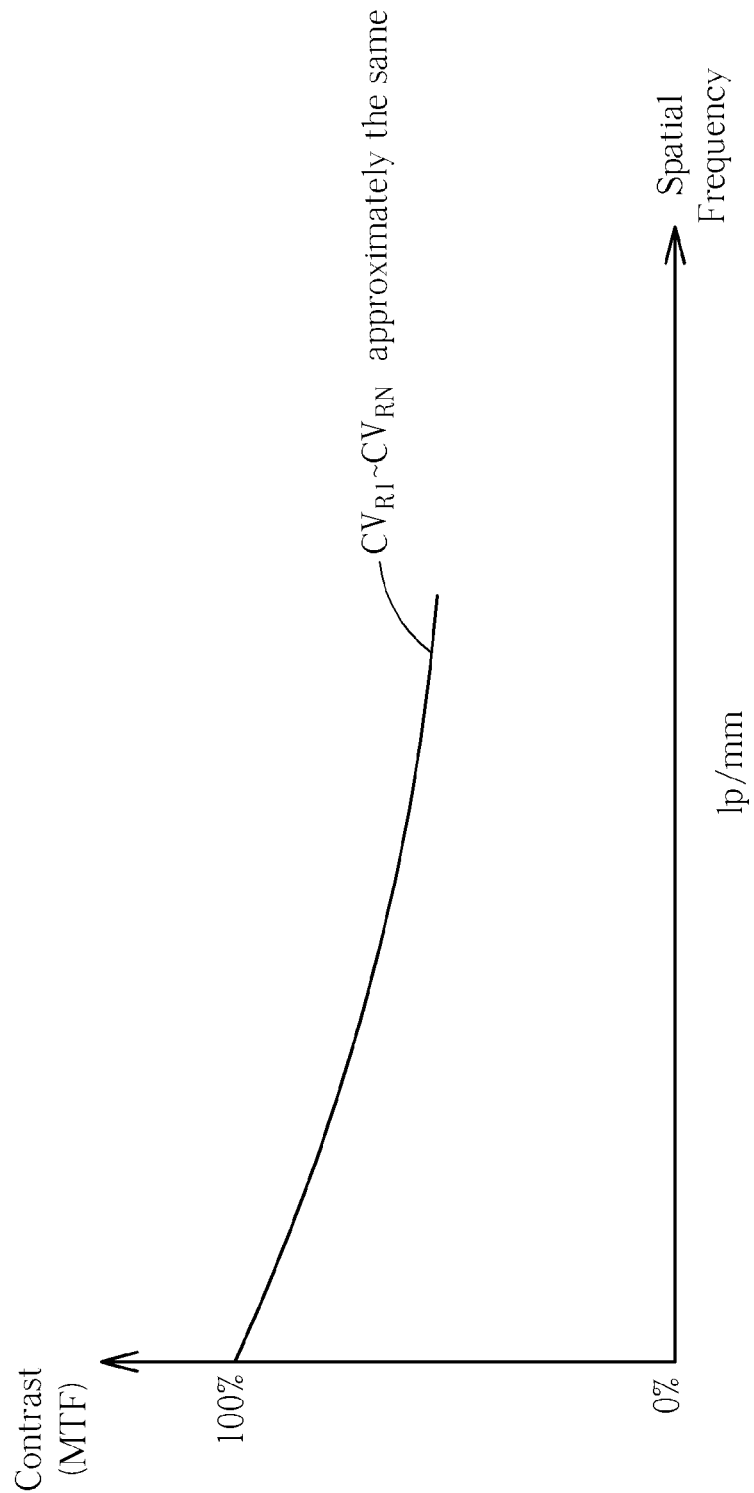
FIG. 11 is a diagram illustrating relationships between contrast and spatial frequency of each region of a sense image generated by the sensing pixel structure of FIG. 9.

In this way, pixel area of all sense pixels located between the central region and the peripheral region of the sensing pixel structure 910 can be determined according to equation (1). Sense pixels closer to the central region of the sensing pixel structure 910 have larger pixel area, and sense pixels further from the central region of the sensing pixel structure 910 have smaller pixel area. Thus, in the optical lens 520, areas with poorer resolution (e.g. areas near the peripheral region, such as those corresponding to regions $R_1$-$R_4$) correspond to a greater number of sense pixels, and areas with better resolution (e.g. areas near the central region, such as those corresponding to regions $R_L$-$R_{(L+1)}$) correspond to fewer sense pixels. In this way, relationship curves $CV_{R1}$-$CV_{RN}$ between the contrast and spatial frequency of each region $R_1$-$R_N$ of the sense image SIM can be approximately the same (as shown in FIG. 11). In other words, the sense image SIM has uniform resolution.

Figure 12:
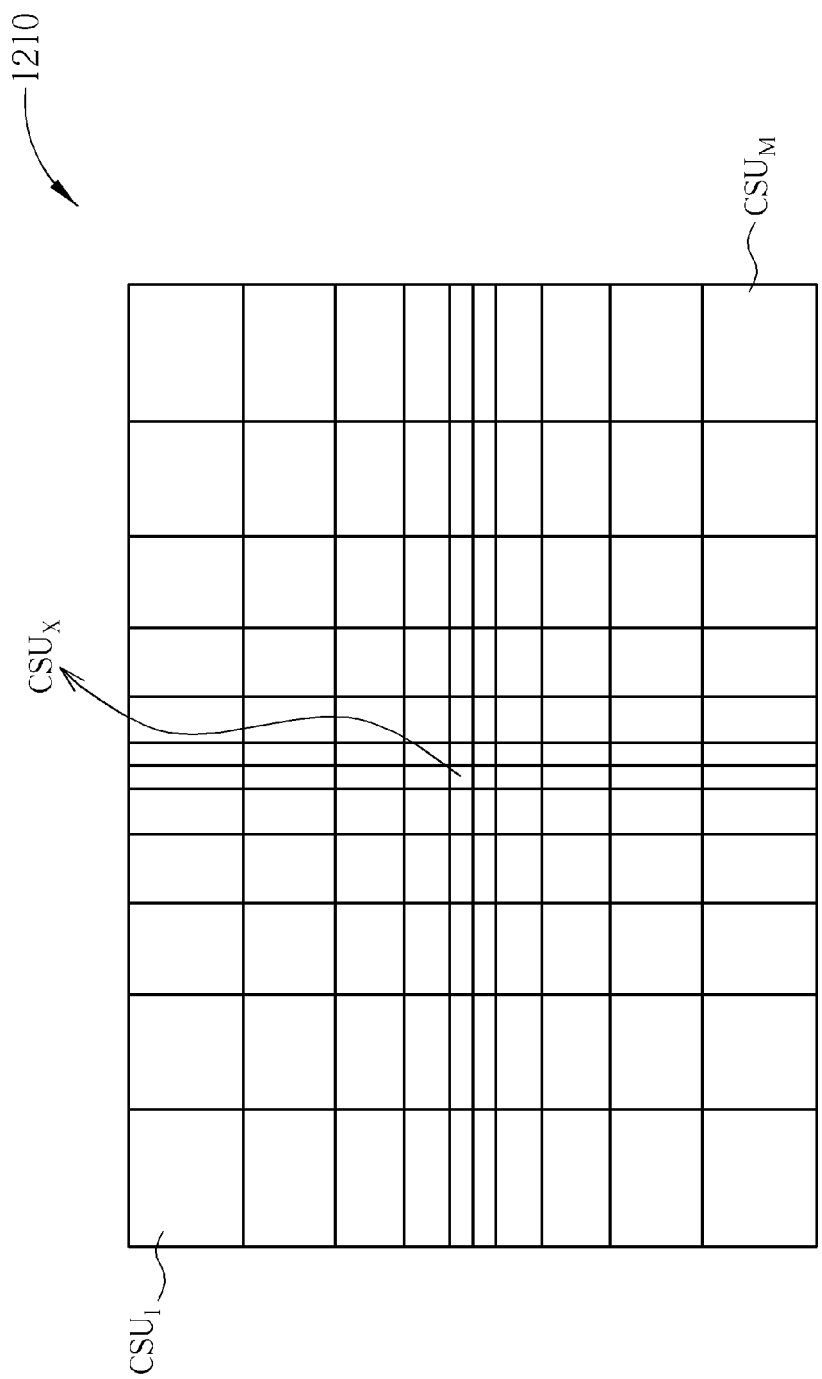
FIG. 12 is a diagram of a sensing pixel structure according to another embodiment.

Please refer to FIG. 12, which is a diagram of a sensing pixel structure 1210 according to another embodiment. The sensing pixel structure 1210 can be used to realize the sensing pixel structure 510 of the optical sensor 500. Compared to the above embodiments, in the present embodiment, it is assumed that resolution in the peripheral region of the optical lens 520 is better than resolution in the central region of the optical lens 520. The sensing pixel structure 1210 comprises sense pixels $CSU_1$-$CSU_M$. Different from the sensing pixel structure 910, in the sensing pixel structure 1210, sense pixels in the central region of the sensing pixel structure 1210 central region (e.g. sense pixel $CSU_X$) have smaller pixel area than sense pixels in the peripheral region of the sensing pixel structure 1210 (e.g. sense pixels $CSU_1$, $CSU_M$). Thus, the central region of the optical lens 510 corresponds to a greater number of sense pixels relative to the peripheral region of the optical lens 510. In the present embodiment, resolution of the peripheral region of the optical lens 520 is better than resolution of the central region of the optical lens 520. However, by using the sensing pixel structure 1210, the central region of the optical lens 520 corresponds to more sense pixels than the peripheral region of the optical lens 520. Thus, the optical sensor 500 can still generate the sense image SIM with uniform resolution.

In the above embodiments, the sensing pixel structure adjusts pixel area of sense pixels in the central region and peripheral region of the sensing pixel structure to adjust number of sense pixels corresponded to by the central region and the peripheral region of the optical sensor, thereby causing the optical sensor to generate the sense image with uniform resolution. In this way, when the user desires to perform further processing on the sense image, the same processing method can be used for both the central region and the peripheral region of the sense image. Thus, using the sensing pixel structure and optical sensor provided by the above embodiments can reduce difficulty encountered by the user in performing processing on the sense image. Further, the sensing pixel structure of the above embodiments allows processing circuit area of the optical sensor to be reduced, which saves cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing pixel structure for generating a sense image with uniform resolution, the sensing pixel structure being used in an optical sensor, and placed corresponding to an optical lens, the sensing pixel structure comprising:
   a plurality of first sense pixels located in a central region of the optical sensor corresponding to a central region of the optical lens, each first sense pixel of the plurality of first sense pixels having a first pixel area; and
   a plurality of second sense pixels located in a peripheral region of the optical sensor, relative to the central region of the optical sensor, and corresponding to a peripheral region of the optical lens, each second sense pixel of the plurality of second sense pixels having a second pixel area;
   wherein the first pixel area is greater than the second pixel area for the peripheral region of the optical lens to correspond to more sense pixels than the central region of the optical lens for the optical sensor to generate a sense image with uniform resolution;
   wherein a central region of the sense image corresponds to the central region of the optical sensor, a peripheral region of the sense image corresponds to the peripheral region of the optical sensor, and a relationship between contrast and spatial frequency of the central region of the sense image is approximately the same as a relationship between contrast and spatial frequency of the peripheral region of the sense image.

2. The sensing pixel structure of claim 1, wherein resolution of the central region of the optical lens is better than resolution of the peripheral region of the optical lens.

3. An optical sensor for generating a sense image with uniform resolution, the optical sensor comprising:
   an optical lens; and
   a sensing pixel structure, a central region of the sensing pixel structure positioned corresponding to a central region of an optical lens, a peripheral region of the sensing pixel structure positioned corresponding to a peripheral region of the optical lens, the sensing pixel structure used for receiving light through the optical lens to generate a sense image with uniform resolution, the sensing pixel structure comprising M sense pixels;

wherein when resolution of the central region of the optical lens is better than resolution of the peripheral region of the optical lens, in the M sense pixels, sense pixels located in the central region of the sensing pixel structure have larger pixel area than sense pixels located in the peripheral region of the sensing pixel structure, and the peripheral region of the optical lens corresponds to more sense pixels than the central region of the optical lens for the sense image to have uniform resolution;

wherein M is a positive integer, and M>1;

wherein the sense image has N regions, and relationship between contrast and spatial frequency of all of the N regions of the sense image are approximately the same for the sense image to have uniform resolution, N is a positive integer, and N<M.

4. The optical sensor of claim 3, wherein contrast of every region of the N regions can be represented by a modulation transfer function (MTF), and spatial frequency of every region of the N regions can be represented by a number of unit-length line-pairs.

5. The optical sensor of claim 3, wherein when resolution of the central region of the optical lens is better than resolution of the peripheral region of the optical lens, in the M sense pixels, sense pixels closer to the central region of the sensing pixel structure have larger pixel area, and sense pixels further from the central region of the sensing pixel structure have smaller pixel area.

6. The optical sensor of claim 5, wherein when resolution of the central region of the optical lens is better than resolution of the peripheral region of the optical lens, pixel area of a Zth sense pixel of the M sense pixels is given by the following equation:

$$(AREA_X - AREA_Z)/(D_{XZ}^2) = (AREA_X - AREA_Y)/(D_{XY}^2);$$

wherein $AREA_X$ represents pixel area of an Xth sense pixel of the M sense pixels, $AREA_Y$ represents pixel area of a Yth sense pixel of the M sense pixels, $AREA_Z$ represents pixel area of the Zth sense pixel of the M sense pixels, $D_{XY}$ represents distance between the Xth sense pixel of the M sense pixels and the Yth sense pixel of the M sense pixels, and $D_{XZ}$ represents distance between the Xth sense pixel of the M sense pixels and the Zth sense pixel of the M sense pixels.

7. The optical sensor of claim 3, wherein an Xth sense pixel of the M sense pixels is located in the central region of the sensing pixel structure, a Yth sense pixel of the M sense pixels is located in the peripheral region of the sensing pixel structure, pixel area of a Zth sense pixel of the M sense pixels is related to distance between the Xth sense pixel of the M sense pixels and the Zth sense pixel of the M sense pixels, distance between the Xth sense pixel of the M sense pixels and the Yth sense pixel of the M sense, pixel area of the Xth sense pixel and pixel area of the Yth sense pixel, X, Y, and Z are all positive integers, X≤M, Y≤M, and Z≤M.

8. An optical sensor for generating a sense image with uniform resolution, the optical sensor comprising:

an optical lens; and a sensing pixel structure, a central region of the sensing pixel structure positioned corresponding to a central region of an optical lens, a peripheral region of the sensing pixel structure positioned corresponding to a peripheral region of the optical lens, the sensing pixel structure used for receiving light through the optical lens to generate a sense image with uniform resolution, the sensing pixel structure comprising M sense pixels;

wherein when resolution of the peripheral region of the optical lens is better than resolution of the central region of the optical lens, in the M sense pixels, sense pixels located in the central region of the sensing pixel structure have smaller pixel area than sense pixels located in the peripheral region of the sensing pixel structure, and the central region of the optical lens corresponds to more sense pixels than the peripheral region of the optical lens for the sense image to have uniform resolution;

wherein M is a positive integer, and M>1;

wherein the sense image has N regions, and relationship between contrast and spatial frequency of all of the N regions of the sense image are approximately the same for the sense image to have uniform resolution, N is a positive integer, and N<M.

9. The optical sensor of claim 8, wherein contrast of every region of the N regions can be represented by a modulation transfer function (MTF), and spatial frequency of every region of the N regions can be represented by a number of unit-length line-pairs.

10. The optical sensor of claim 8, wherein an Xth sense pixel of the M sense pixels is located in the central region of the sensing pixel structure, a Yth sense pixel of the M sense pixels is located in the peripheral region of the sensing pixel structure, pixel area of a Zth sense pixel of the M sense pixels is related to distance between the Xth sense pixel of the M sense pixels and the Zth sense pixel of the M sense pixels, distance between the Xth sense pixel of the M sense pixels and the Yth sense pixel of the M sense, pixel area of the Xth sense pixel and pixel area of the Yth sense pixel, X, Y, and Z are all positive integers, X≤M, Y≤M, and Z≤M.

* * * * *